(12) United States Patent
Thomas et al.

(10) Patent No.: US 6,674,610 B1
(45) Date of Patent: Jan. 6, 2004

(54) THIN FILM WRITE HEAD WITH UNIVERSAL COIL DESIGN

(75) Inventors: Mark Thomas, Hollister, CA (US); David Seagle, Morgan Hill, CA (US); Carlos Corona, Pleasanton, CA (US); Amritpal Rana, Union City, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 296 days.

(21) Appl. No.: 09/594,417

(22) Filed: Jun. 16, 2000

(51) Int. Cl.[7] ................................................. G11B 5/17
(52) U.S. Cl. ........................................................ 360/123
(58) Field of Search ................................. 360/123, 126, 360/317; 29/603.13, 603.14, 603.15

(56) References Cited

U.S. PATENT DOCUMENTS

| | | | | |
|---|---|---|---|---|
| 4,044,394 A | * | 8/1977 | Hanazono et al. | 360/123 |
| 4,149,205 A | * | 4/1979 | Berghof et al. | 360/123 |
| 4,260,450 A | * | 4/1981 | Neu | 216/22 |
| 4,323,941 A | * | 4/1982 | Lazzari et al. | 360/123 |
| 4,764,834 A | * | 8/1988 | Roscamp et al. | 360/126 |
| 4,962,437 A | * | 10/1990 | Wilcox | 360/234.7 |
| 5,452,164 A | | 9/1995 | Cole et al. | 360/113 |
| 5,486,968 A | | 1/1996 | Lee et al. | 360/126 |
| 5,557,492 A | * | 9/1996 | Gill et al. | 360/319 |
| 5,751,522 A | * | 5/1998 | Yamada et al. | 360/126 |
| 5,923,506 A | | 7/1999 | Herrera | 360/126 |
| 5,936,811 A | * | 8/1999 | Seagle | 360/322 |
| 6,069,015 A | * | 5/2000 | Gray et al. | 29/603.01 |
| 6,130,863 A | * | 10/2000 | Wang et al. | 369/13.23 |
| 6,324,036 B1 | * | 11/2001 | Dill et al. | 360/320 |
| 6,417,990 B1 | * | 7/2002 | Zhou et al. | 360/126 |
| 6,436,560 B1 | * | 8/2002 | Kato et al. | 428/692 |

* cited by examiner

*Primary Examiner*—A. J. Heinz
*Assistant Examiner*—Angel Castro

(57) ABSTRACT

In at least one embodiment, a thin film write head having a conductor with a coil structure having a central axis perpendicular to an air bearing surface. The conductor having a first contact centrally located at a first end of the conductor. The conductor having plurality of contacts located distal from the first contact. The plurality of contacts having at least one contact on either side of the central axis of the write head.

20 Claims, 4 Drawing Sheets

THIN FILM WRITE HEAD WITH UNIVERSAL COIL DESIGN

BACKGROUND

Data are stored on magnetic media by writing on the magnetic media using a write head. Magnetic media can be formed in any number of ways, such as tape, stripe, floppy diskette, and hard disk. It is now common, especially in disk type storage, to provide dual sided media, media capable of storage on two sides, so as to reduce storage device size.

Writing involves storing a data bit by utilizing magnetic flux to set the magnetic moment of a particular area on the magnetic media. The state of the magnetic moment or bit transition is later read, using a read head, to retrieve the stored information.

Write and read heads typically are fabricated in a merged head structure, with the write head being formed over the read head. In a typical write head structure, such as disclosed in U.S. Pat. No. 5,452,164, by Cole et al., entitled THIN FILM MAGNETIC WRITE HEAD, issued Sep. 19, 1995, herein incorporated by reference in its entirety, write current is supplied to a conductor coil to generate the magnetic flux. In such a multilayer design, the conductor coil is provided with contacts. The contacts are connected by-vias and lead lines to terminal pads. Lead wires coupled to driver circuitry are connected to the terminal pads. The read head likewise is provided with contacts and terminal pads for lead wire connection to reader circuitry.

Terminal pad location is dictated by read head bias and by storage device layout. For example, the direction of write coil current flow must correspond to read head bias direction. To add to this, different manufactures of storage devices often will require different terminal pad layouts. Further, in multi-disk drives it is desirable to assemble the drives so that terminal pads and lead wires of similar head types and polarity are stacked adjacent one another. To achieve this, for example, some heads must be fabricated having terminal pads on the right hand side, while some heads must be fabricated with terminal pads on the left hand side, so that corresponding terminal pads are located on the same right/left hand side when located adjacent opposing surfaces of the media.

With conventional write heads, this requires right and left coil layouts, in particular layouts with coil contacts located on either the right or the left hand side. In some instances, due to yield variances, a head manufacture could end up with a shortage of a particular type. Thus, what is needed is a write head layout that allows terminal pads to be located on either side of the head.

Furthermore, as heads become ever smaller and cheaper an improved write head design is necessary, without increasing layout intricacy or impacting the processing time of the head.

SUMMARY

In at least one embodiment, a thin film write head having a conductor with a coil structure having a central axis perpendicular to an air bearing surface. The conductor having a first contact centrally located at a first end of the conductor. The conductor having plurality of contacts located distal from the first contact. The plurality of contacts having at least one contact on either side of the central axis of the write head.

DETAILED DESCRIPTION OF PREFERRED EMBODIMENTS OF THE PRESENT INVENTION

Figure 1:
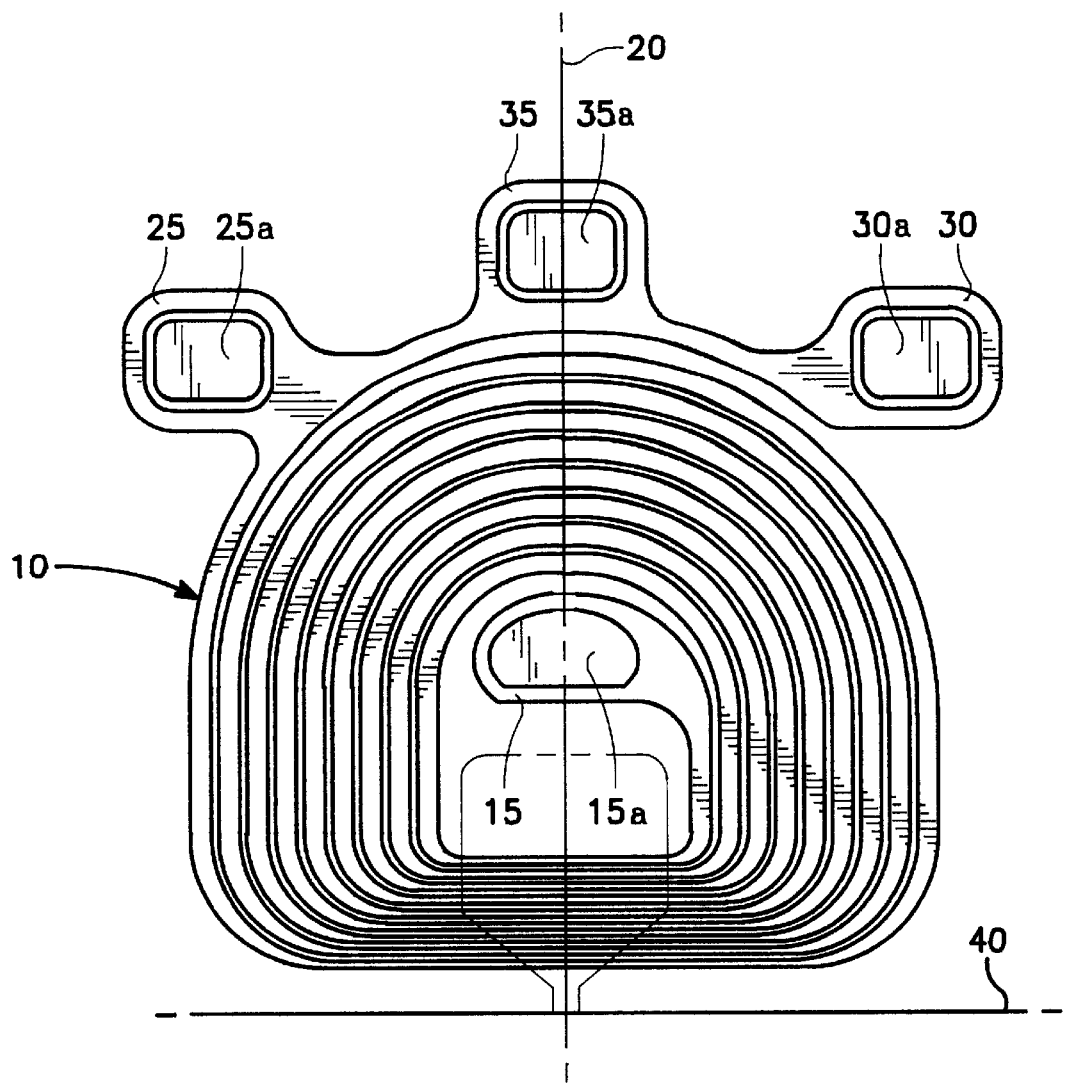
FIG. 1 shows a partial cut away top view of a write head in accordance with a preferred embodiment.

FIG. 1 shows a partial cut away top view of a write head in accordance with a preferred embodiment. In this embodiment, a write coil 10 has a first contact 15 disposed in a central portion of the coil structure at one end of the coil 10. The write coil 10 has a second contact 25 and a third contact 30 disposed on a peripheral turn of the coil structure. The second and third contacts 25 and 30, are disposed on opposite sides of a central axis 20 perpendicular to air bearing surface 40 of the coil structure.

In this embodiment, the third contact 30 is located at the second end of the coil 10, while the second contact 25 is located proximate to the second end of the coil and symmetrically disposed with respect to the third contact 30 across the central axis 20.

An optional fourth contact 35 may be disposed between the second and third contacts 25 and 30. In such an embodiment, the fourth contact 35 may be located on the central axis 20 of the coil structure.

Figure 2:
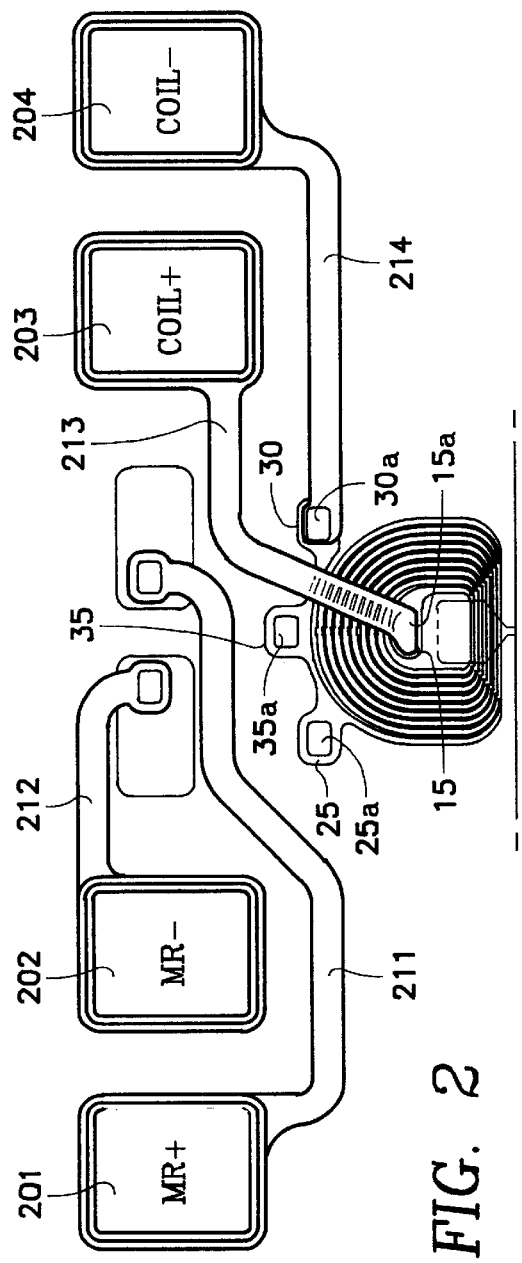
FIG. 2 illustrates a possible terminal pad layout for a merged head embodiment.
Figure 3:
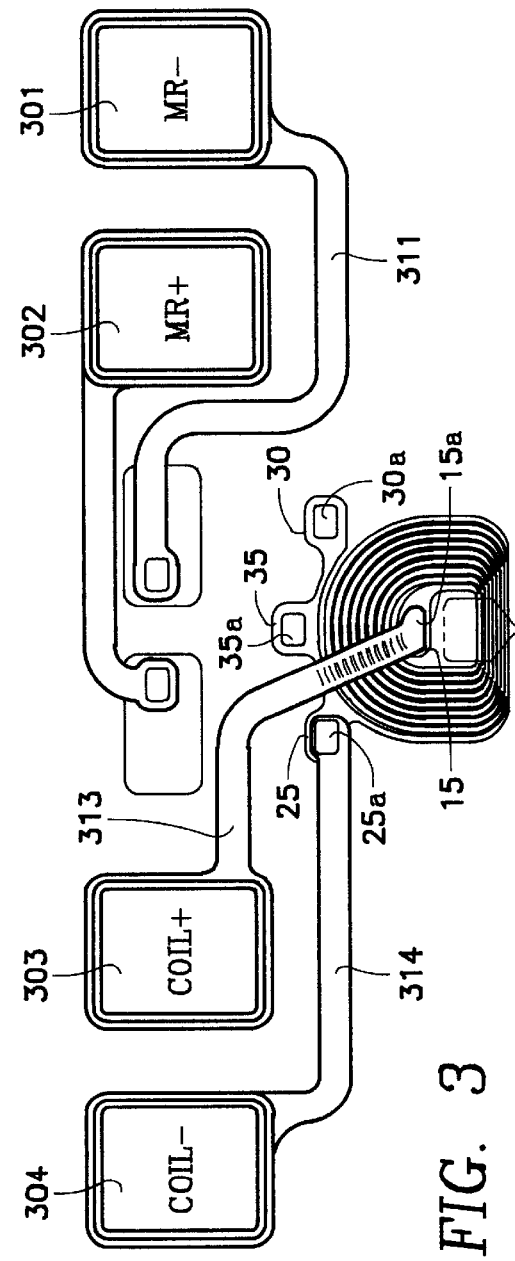
FIG. 3 illustrates the corresponding terminal pad layout of FIG. 2 for a dual side media device embodiment.

FIGS. 2 & 3 illustrate a possible terminal pad layout to provide a merged head embodiment for a dual sided media. FIG. 2 illustrates, for example, an "up" facing head embodiment, while FIG. 3 illustrates a corresponding "down" facing head embodiment. When the heads are installed in the storage device, terminal pads 201–204 are capable of aligning with terminal pads 301–304 respectively to allow lead wires (not shown) for the same head type, i.e. write or read head, and polarity to be adjacent when routed to the terminal pads. This eases fabrication and minimizes possible cross-talk between wires.

A feature of this preferred embodiment of the coil structure of the present invention is that the layout of the coil contact pads 15, 25, and 30 allows the terminal pads 203, 204, or 303, 304 to be located on either side of the coil 10 without having to produce a different coil and contact layout for each terminal pad configuration. One benefit of this is that both "up" and "down" coil configurations easily can be produced on a single wafer without the need for complicated masking and developing stepper routines. A further advantage is that the coil 10 and underlying read head (not shown) may be fabricated and tested before the terminal pads are routed with drive leads 213, 214, or 313, 314. As such, yield variances will not cause a disparity in the number of coil structures capable of "up" or "down" orientation because terminal pad location may be selected after the yield variances has been determined._

It is important to note that with the universal coil contact layout of the present invention, the same coil and contact layout may be selected to provide write current flow in either direction around the coil. For example, terminal pad 203 instead may have lead line (not shown) routed to contact 30 with terminal pad 204 being routed via lead line (not shown) to contact 15 to provide opposite current flow direction through the coil 10. In this way current direction through the coil selected to flow clockwise, or counterclockwise to correspond to the selected bias of the read head. As such, the coil may be fabricated without regard to the read head bias. In some embodiments, this allows the read head bias to be set, or to be re-set, such as by an annealing process after the write head portion is fabricated, if desired.

Thus, the contacts 15, 25, and 30 allow driver leads to be routed to terminal pads 203, 204, or 303, 304 located on either side of the central axis and to have either polarity without crossing the driver leads and without crossing over the central axis. The contacts 15, 25, and 30 typically have vias 15a, 25a, and 30a, respectively for coupling to the driver leads 213, 214, or 313, 314. Such embodiments provide a universal coil tap means for allowing routing of a pair of driver leads from a pair of pads located on either side of the central axis to the conductor coil without crossing the driver leads over each other and without either of the driver leads crossing over the central axis and for allowing the driver leads to be routed to provide current flow in either a clockwise or counterclockwise direction within the conductor coil for any selected pad polarity.

The optional contact 35 may be centrally located on the outermost turn of the coil 10 to provide further flexibility. As such, an alternate embodiment not shown, a driver lead (not shown) may be routed from terminal pad 203 to terminate at contact 35, rather terminating at contact 15 as shown in FIGS. 2 & 3, while the other driver lead (not shown) may be routed from terminal pad 204 to terminate at contact 15.

Figure 4:
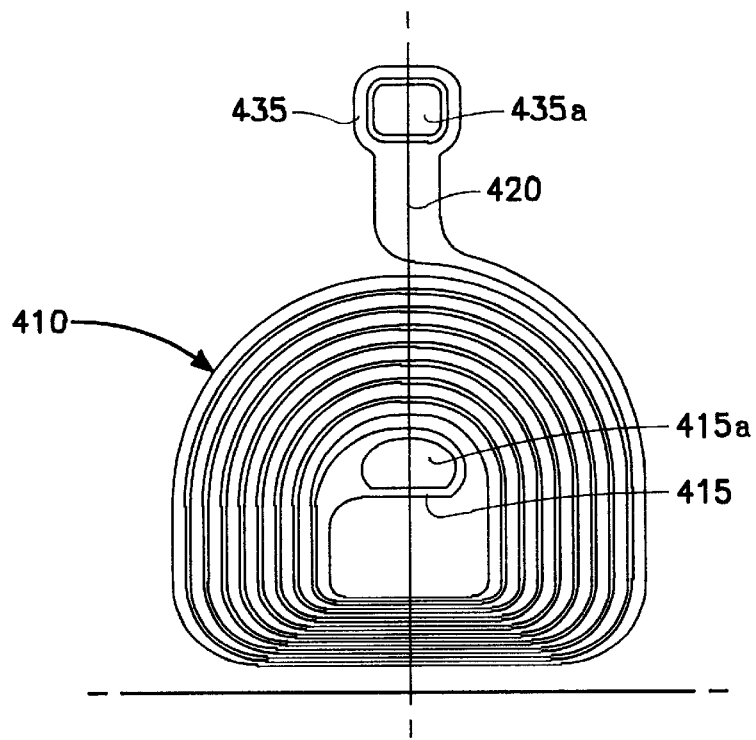
FIG. 4 shows partial cut away top view of a write head in accordance with an alternate embodiment of the present invention showing a first conductor layer of a two layer conductor coil.
Figure 5:
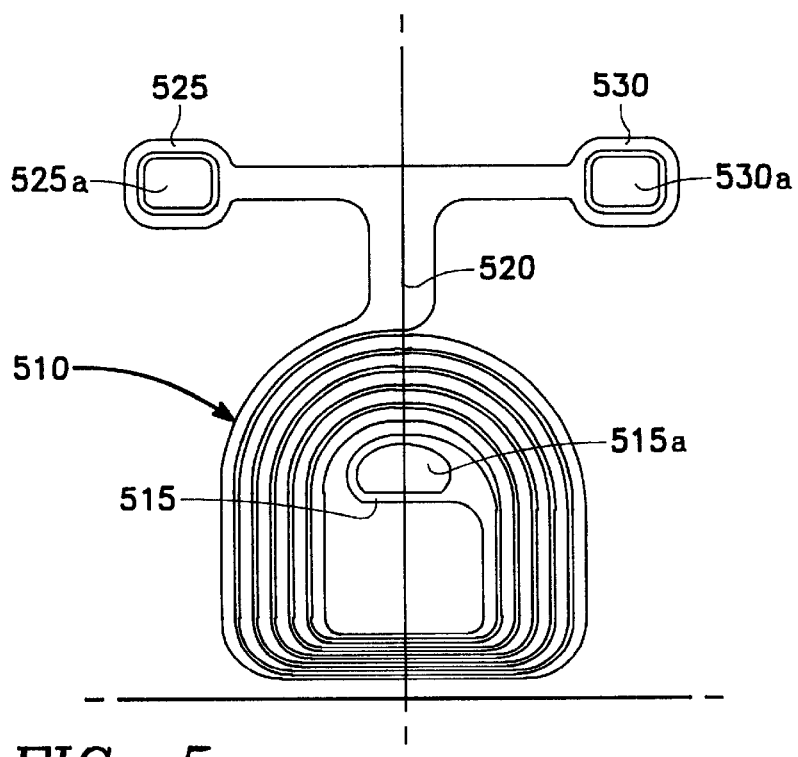
FIG. 5 shows partial cut away top view of a write head in accordance with an alternate embodiment of the present invention showing a second conductor layer of the two layer conductor coil of FIG. 4.
Figure 6:
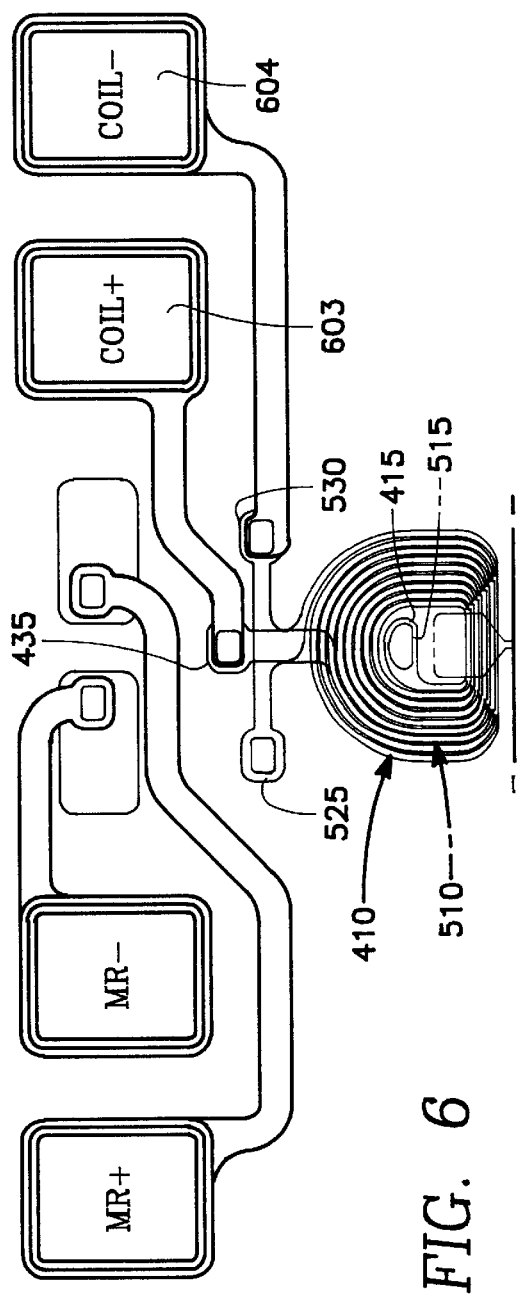
FIG. 6 illustrates a possible terminal pad layout for the two layer merged head embodiment of FIGS. 4 & 5.
Figure 7:
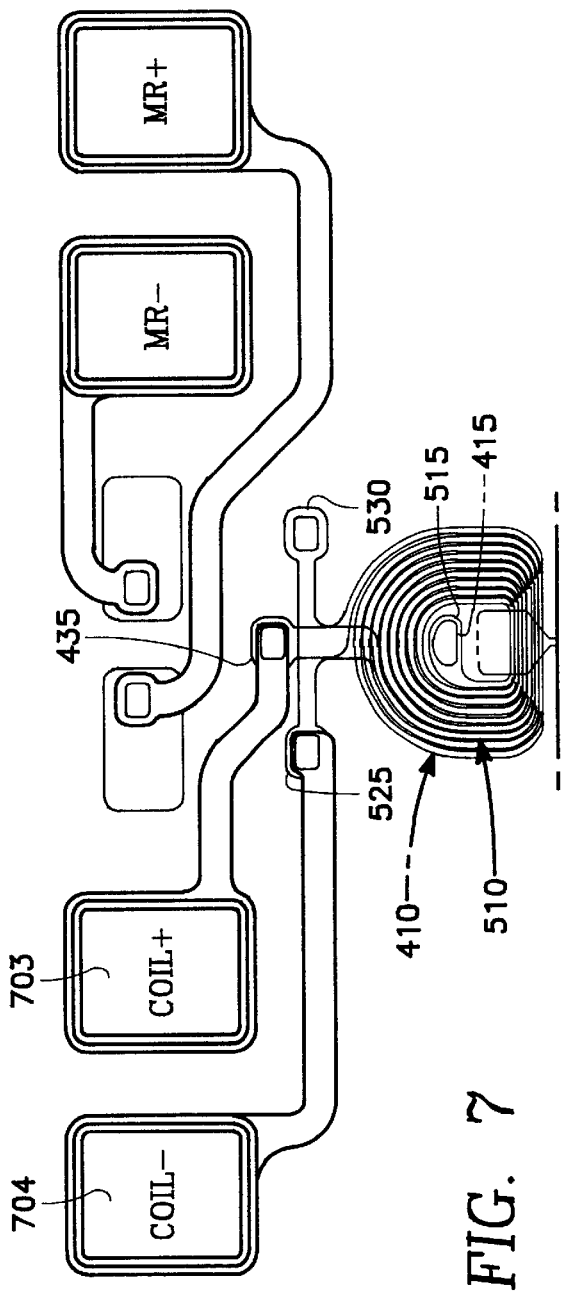
FIG. 7 illustrates the corresponding terminal pad layout of FIG. 6 for a dual side media device embodiment.

FIGS. 4 & 5 FIGS. 4 & 5 show partial cut away top views of a write head in accordance with an alternative embodiment of the present invention having two layers of coils 410 and 510. In this embodiment, the first layer coil 410 has a first contact 435 at one end of the coil 410 for coupling to a terminal pad 603, or 703, as shown in FIGS. 6 & 7. The second coil layer 510 has a plurality of contacts 525 and 530 for coupling to a terminal pad 704 and 604, respectively, as shown in FIGS. 6 &7. The first and second coil layers 410 and 510 are stacked with contacts 415 and 515 coupled together so as to form a two layer conductor coil. Thus, when coupled together via contacts 415 and 515, the plurality of contacts 525 and 530 are disposed on the two layer conductor coil distal from the first contact 435. The contacts 435, 525, and 530 typically have vias 435a, 525a, and 530a as discussed above.

The first contact 435 may be located on the central axis 420 and couple to a peripheral turn of the first coil 410 as shown in FIG. 4. The plurality of contacts 525 and 530 are located on either side of the central axis 520 and couple to a peripheral turn of the second coil 520 as shown in FIG. 5. The contacts 430, 525, and 530 may be located on portions extending laterally away from the coil structures to facilitate driver lead connection as illustrated in FIGS. 6 & 7.

FIGS. 6 & 7 illustrate corresponding "up" and "down" heads for a possible selection of terminal pad 603, 604, and 703, 704 connections for a two layer conductor layout.

The present invention is not limited to terminal pad layouts for center rail slider type devices as shown in FIGS. 2, 3, 6 & 7, but also is intended for use in side rail type devices. An example of side rail terminal pad locations are shown in Lee et al., U.S. Pat. No. 5,486,968, issued on Jan. 23, 1996, entitled METHOD AND APPARATUS FOR SIMULTANEOUS WRITE HEAD PLANARIZATION AND LEAD ROUTING, herein incorporated by reference in its entirety.

While the preferred embodiments of the present invention have been described in detail above, many changes to these embodiments may be made without departing from the true scope and teachings of the present invention. The present invention, therefore, is limited only as claimed below and the equivalents thereof.

What we claim is:

1. A thin film write head comprising:
    a) a conductor having a coil structure having a central axis perpendicular to an air bearing surface, the conductor comprising:
        (i) a first contact coupled to the conductor near a first end thereof and disposed in a central portion of the coil structure; and
        (ii) second and third contacts coupled to the conductor near a second end thereof and disposed at a periphery of the coil structure, the second and third contacts being disposed on opposite sides of the central axis of the coil structure.

2. The thin film head of claim 1 wherein the second and third contacts are symmetrically disposed with respect to the central axis of the coil structure.

3. The thin film head of claim 2 wherein the first contact is disposed on the central axis of the coil structure.

4. The thin film head of claim 3 further comprising a fourth contact coupled to the conductor and disposed between the second and third contacts on the central axis of the coil structure.

5. The thin film head of claim 1 wherein the first contact is disposed on the central axis of the coil structure.

6. The thin film head of claim 5 further comprising a fourth contact coupled to the conductor and disposed between the second and third contacts on the central axis of the coil structure.

7. The thin film head of claim 1 further comprising a fourth contact coupled to the conductor and disposed between the second and third contacts.

8. The thin film head of claim 7 wherein the fourth contact is disposed on the central axis of the coil structure.

9. The thin film head of claim 7 wherein the first, second, third, and fourth contacts are disposed so as to allow a pair of driver leads to be routed to ones of the first, second, third, or fourth contacts from a pair of pads located on either side of the central axis without crossing the driver leads over each other and without either of the driver leads crossing over the central axis and so as to allow driver leads to be routed to provide current flow in either a clockwise or a counterclockwise direction within the coil structure for any selected pad polarity.

10. The thin film head of claim 1 wherein the first, second, and third contacts are disposed so that a pair of driver leads may be routed to ones of the first, second, or third contacts from a pair of pads located on either side of the central axis without crossing the driver leads over each other and without either of the driver leads crossing over the central axis so as to cause write current to flow through the conductor.

11. The thin film head of claim 10 further comprising the first, second, and third contacts being disposed so as to allow driver leads to be routed to provide current flow in either a clockwise direction within the coil structure for a selected pad polarity.

12. A thin film write head comprising:
a) a conductor having a coil structure having a central axis perpendicular to an air bearing surface, the conductor comprising:
  (i) a first contact disposed on the central axis and coupled to the conductor near a first end of the conductor; and
  (ii) a plurality of contacts coupled to the conductor near a second end of the conductor, the plurality of contacts comprising at least one contact on either side of the central axis.

13. The thin film head of claim 12 wherein the conductor comprises two layers.

14. The thin film head of claim 13 wherein the first contact couples to a peripheral turn of the other of the two layers of the conductor.

15. The thin film head of claim 14 wherein the plurality of contacts couple to a peripheral turn of the other two layers of the conductor.

16. The thin film head of claim 13 wherein the plurality of contacts are disposed so as to allow connection of driver leads from either side of the central axis without crossing the driver leads and without crossing over the ventral axis.

17. A thin film head comprising:
a write head comprising a conductor coil having a central axis perpendicular to an air bearing surface comprising a universal coil tap means for allowing routing of a pair of driver leads from a pair of pads located on either side of the central axis to the conductor coil without crossing the driver leads over each other and without either of the driver leads crossing over the central axis and for allowing the driver leads to be routed to provide current flow in either a clockwise or a counterclockwise direction within the conductor coil for any selected pad polarity.

18. The thin film head of claim 17 wherein the universal coil tap means comprises a first contact coupled to the conductor near one end of the conductor coil and a plurality of contacts coupled to the conductor near the other end of the conductor coil.

19. The thin film head of claim 18 wherein the first contact is disposed on the central axis in a central region of the conductor coil, and wherein the plurality of contacts comprises a second contact and a third contact each disposed on opposite sides of the central axis.

20. The thin film head of claim 19 wherein the plurality of contacts further comprises a fourth contact disposed on the central axis.

* * * * *